Nov. 24, 1936. G. W. JOHNSON 2,062,030
ROTARY CYLINDER CONSTRUCTION
Filed May 31, 1934
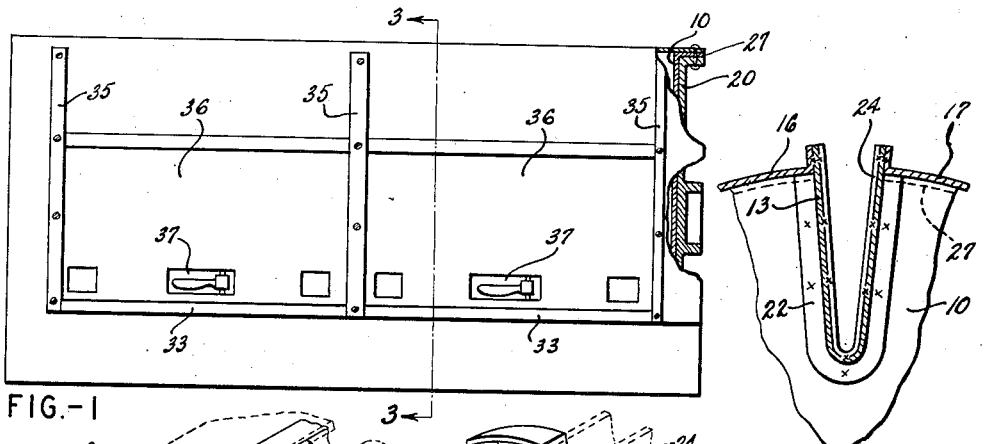
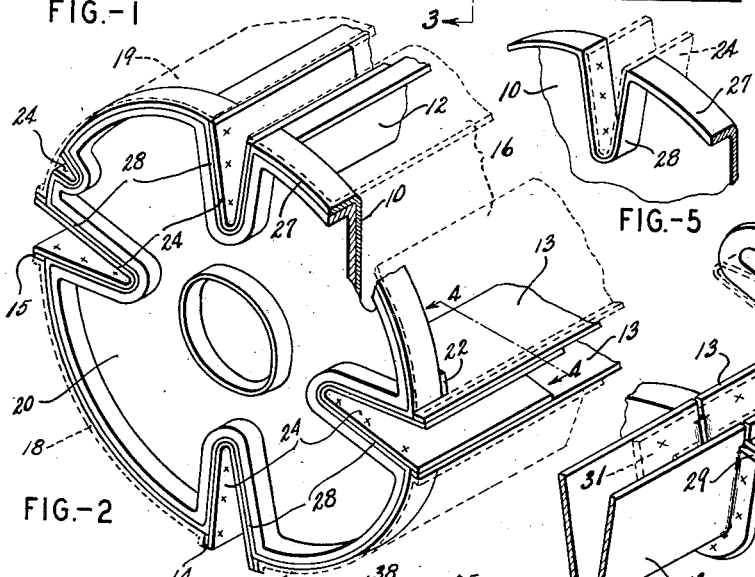
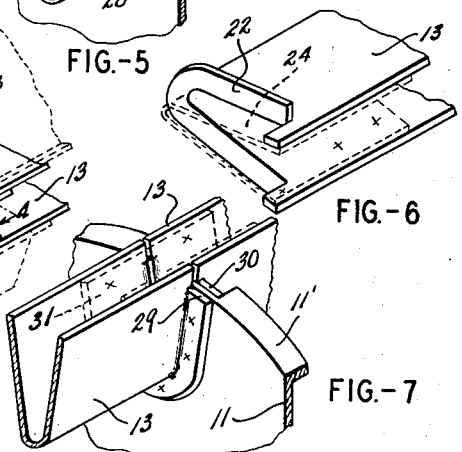
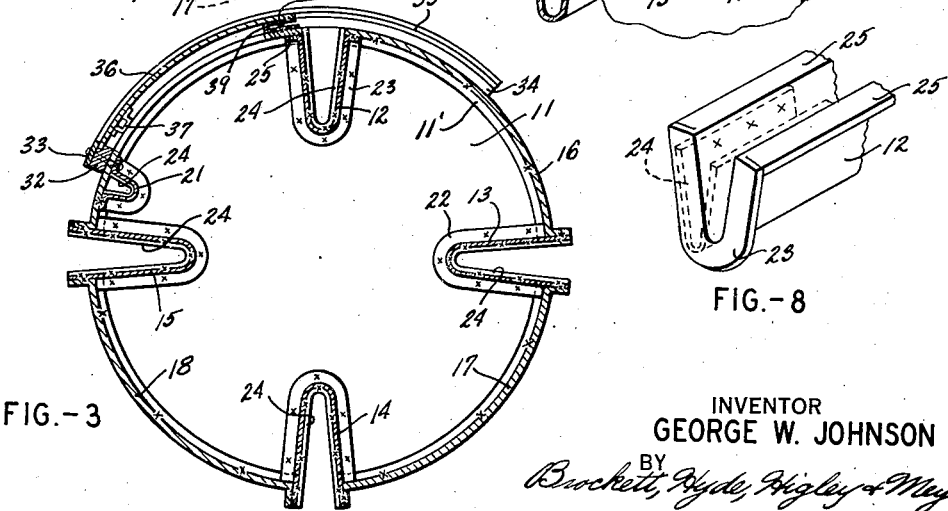
INVENTOR
GEORGE W. JOHNSON
BY
Brockett, Hyde, Higley & Meyer
ATTORNEYS

UNITED STATES PATENT OFFICE 2,062,030

ROTARY CYLINDER CONSTRUCTION

George W. Johnson, Cincinnati, Ohio, assignor to
The American Laundry Machinery Company,
Norwood, Ohio, a corporation of Ohio Application May 31, 1934, Serial No. 728,217

4 Claims. (Cl. 68—18)

This invention relates to rotary cylinders such as are used in washing machines or the like and particularly to a cylinder structure wherein the parts are arranged to be readily fabricated using spot welding as the means for securing the parts together. The stations where the spot welds occur are in positions readily accessible to the welding electrodes which contributes to a more efficient and speedier fabrication as well as more durable unions and sturdier construction.

An object of the invention is to reduce the number of seams exposed on the interior of the cylinder so as to reduce the possibility of damaging articles being processed which might be caught or worn by contact with such seams. This is accomplished by eliminating lifting rib castings or stirrups. This requires certain changes in the conventional lifting rib which would result in a weakening of the cylinder structure were it not that means is provided to strengthen the rib construction.

Other objects and advantages of my invention will become apparent as the description proceeds and one embodiment is illustrated in the accompanying drawing, wherein Fig. 1 is a front elevation of a washing machine cylinder, parts being broken away to show details of construction; Fig. 2 is a fragmental perspective view of an end of the cylinder partly broken away to show details; Fig. 3 is a transverse section through the cylinder along the line 3—3 of Fig. 1 showing an intermediate partition member; Fig. 4 is a fragmental sectional view along the line 4—4 of Fig. 2; Fig. 5 is a fragmental detail of the cylinder head sheet showing a rib extension member in broken lines; Fig. 6 is a fragmental detail showing the end construction of one of the lifting ribs, the rib extension member being shown in broken lines; Fig. 7 is a fragmental detail perspective view of any one of the large lifting ribs other than the one over which the doors pass and showing the connections with the transverse intermediate partition, the rib reinforcing member being shown in broken lines; while Fig. 8 is a fragmentary detail showing the end construction of the lifting rib over which the door slides when it is opened or closed, the rib extension member being shown in broken lines.

A cylinder of the type illustrated is generally horizontally disposed and driven from the ends. The cylinder is therefore subjected both to the dead load of the goods and to torsional stresses due to the application of driving torque at one end of the cylinder. Inasmuch as these machines are often intermittently reversed in direction of rotation, the torsional strains occur alternately in opposite directions, which necessitates a cylinder structure of great strength and rigidity if long life of the equipment and efficient operation thereof is to be provided. In general, my improvement provides for the elimination of lifting rib castings or stirrups by which the ribs are usually connected to the head sheets or transverse partition sheets of a cylinder. This is accomplished by providing out-turned flanges at the ends of the lifting ribs which abut the faces of transverse partition sheets and are welded thereto. With this construction, the rib ends at the face of the partition sheet to which it is welded and I provide means for extending the ribs beyond such points in a manner to provide rigid connecting means with the cylinder head sheets and rigid reinforcing members where the ribs cross intermediate partition members so as to provide continuous longitudinally extending lifting ribs from end to end of the cylinder rib to withstand the bending and torsional strains above described.

In the embodiment shown, I have illustrated a washing machine cylinder illustrated, described and claimed in the copending application of Charles E. Waream, Ser. No. 638,767, filed October 20, 1932. Such a cylinder comprises in general a chassis or skeleton frame comprising head sheets 10, intermediate partition sheets as desired, in the present instance one being shown at 11, and these members being connected by a plurality of longitudinally extending peripherally disposed lifting ribs 12, 13, 14, 15. On this frame are assembled the cylinder body sheets 16, 17, 18, 19 which are generally perforated if the machine is used for washing purposes. To the head sheets are secured transmitters 20 which serve as connections between driving gudgeons (not shown) which in turn are connected with the mechanism for rotating the cylinder. The cylinder shown has a circumferentially sliding door for access to each compartment and the lifting rib construction is varied to permit such a door movement. For instance, the ribs 13, 14, and 15 extend radially beyond the periphery of the cylinder for a purpose later disclosed, whereas the rib 12 and a small rib 21 located adjacent the door are formed flush with the periphery of the cylinder so as to permit the door to slide thereover. This construction is well illustrated in Fig. 8 where the rib 12 is shown provided with the outwardly turned longitudinally extending flanges 25 which conform to the inner surface of the cylinder body sheets.

In my improved construction the end of a lifting rib is provided with out-turned flanges as shown at 22 in Fig. 6 or 23 in Fig. 8. These flanges abut the inner face of a head sheet and are suitably secured thereto, preferably by welding or by any other equivalent method which avoids cracks or protuberances. The usual construction at this point is to provide a stirrup, generally a casting or angle member which requires not only welding generally corresponding to that necessary with the flanges 22 and 23 but also an extra joint where such stirrup is secured to the lifting rib. By my improved construction I eliminate this extra joint with the attendant possibility of damage to goods treated in the cylinder.

To insure a rigid connection between the lifting rib and the head sheet and thus also an efficient driving connection with the transmitter, I provide rib extension members 24 which are rigidly connected to the inner face of a lifting rib and extend through suitable recesses or openings in the head sheet. In the cylinder illustrated the lifting ribs are channel-shaped and the head sheets which are generally circular are provided with circumferentially spaced radially extending recesses generally conforming to the shape of the lifting rib. As shown, the extension members 24 comprise plates bent to conform to the inner surface of the channel-shaped rib and secured thereto by welding. These extension members enter snugly the recesses in the head sheets and are rigidly secured to the head sheets. Preferably the heads are provided with outwardly turned peripheral flanges 27 and these flanges extend about the edges of the recesses as indicated at 28, and to these flange portions 28 the extension members 24 are secured as by spot welding, the members 24 and 28 preferably being coextensive.

Where an intermediate partition member is provided as shown at 11, the partition sheet is provided with peripherally disposed recesses adapted to receive the lifting ribs and in this case each rib comprises longitudinally aligned portions having out-turned end flanges 29 and 30 which abut opposite faces of the partition sheet and are secured thereto by spot welding or other equivalent method. To strengthen this joint and to provide a substantially continuous rigid longitudinal lifting rib from end to end of the cylinder a reinforcing member 31 is provided which overlaps the adjacent ends of the rib portions and is rigidly secured to each portion as by spot welding. Preferably this reinforcing member is a plate bent to conform to the inner surface of the rib which provides a very strong construction.

The door construction comprises a bottom stop strip 32, and lower guide strip 33, these two members being riveted together through the cylinder body sheet 19 and one of the flanges of the small rib 21. The side door slides 34 are riveted to the cylinder sheets and door guides 35 are assembled thereon by means of flat head screws so that the doors may be replaced where necessary. The door is shown at 36 and has a suitable latch box 37 securely mounted thereon and a stop member 38 at its rear edge. A coacting door stop member 39 is welded to the cylinder at the same time that cylinder sheet 19 is welded in position.

My improved construction is easy to fabricate and assemble by means of spot welding apparatus. The first step is to assemble the lifting ribs 12, 13, 14, 15, and 21 so that they will extend uninterruptedly longitudinally through the entire length of the cylinder. The first assembly step is to spot weld the reinforcing members 31 to the various lifting ribs at the points where partition members are to be provided. At this time the aligned rib portions are spaced apart sufficiently to permit the later entry of the intermediate partition sheet between adjacent end flanges, such as those illustrated at 29 and 30. In the next operation the end extension members 24 are spot welded in each end of each lifting rib. The next operation consists in spot welding the intermediate partition sheet 11 and the end head sheets 10 to the assembled lifting ribs. The above members assembled in place provide the chassis or skeleton frame. This portion of the assembly is then placed in a suitable work-holding fixture and the assembly of the cylinder body sheets thereon is begun. Sheet 16 is placed in position and welded along its one edge to the flanged portion of lifting rib 12 and at its other edge is welded to the radially outwardly projecting flange of rib 13. Cylinder sheets 17 and 18 are next placed in position and welded along the outwardly projecting flange portions that abut the corresponding lifting rib portions which extend beyond the periphery of the cylinder. Sheet 19 is then placed in position and welded to the lifting rib 15, to the small lifting rib 21 and its upper edge welded to the flange of rib 12 opposite to the flange to which sheet 16 is secured. The flange 11' of the intermediate partition sheet is then welded to the cylinder sheets at suitable locations. The door parts are then assembled as above described and the final operation consists in assembling the transmitters 20 and riveting or otherwise securing them to the cylinder body sheets and head sheets through the overlapping portions.

I thus provide a washing machine cylinder in which I eliminate a number of the seams heretofore exposed on the inner surface of the cylinder. Nevertheless, this is accomplished while retaining all the advantages of rigid, structurally strong, longitudinally extending lifting ribs extending the entire length of the cylinder and having a rigid connection with the member that transmits the driving force to the cylinder itself. At the same time, the parts are so arranged that they are easily accessible to the spot welding apparatus during the steps of fabricating the cylinder, thus rendering possible the production of a sturdy and speedy assembly job.

What I claim is:

1. In a cylinder of the class described, end construction comprising a generally circular head sheet having an outwardly turned peripheral flange, a channel-shaped lifting rib having out-turned end flanges abutting the inner face of said head sheet and welded thereto, an extension member conforming to the inner surface of the end of said rib and welded thereto, said member extending beyond the end of said rib coextensive with said head sheet flange, and means for securing said member to said sheet.

2. In a cylinder of the class described, end construction comprising a generally circular head sheet having circumferentially-spaced radially-extending lifting-rib-receiving recesses, outwardly turned flanges on said head sheet about the circumferential periphery thereof and about said recesses, channel-shaped lifting ribs having out-turned end flanges abutting the inner face of said head sheet adjacent said recesses and welded thereto, and channel-shaped extension members conforming to the inner surfaces of the ends of said ribs and welded thereto, said members extending beyond the ends of said ribs into said recesses and coextensive with said flanges thereabout and secured thereto by welding.

3. In a cylinder of the class described having a transverse sheet member, rib construction comprising a channel-shaped lifting rib having outturned end flanges abutting one face of said transverse member and secured thereto, an extension plate member within said rib and contacting the inner surface thereof and welded thereto and extending beyond the end of said rib and beyond the other face of said sheet member, and means for securing said extension plate beyond said other face.

4. In a cylinder of the class described having a transverse sheet member, rib construction comprising a channel-shaped lifting rib having outturned end flanges abutting one face of said transverse member and secured thereto, an extension channel-shaped plate member conforming to the inner surface of the end of said rib and welded thereto and extending beyond the end of said rib and beyond said sheet member, and means for securing said extension plate member beyond the other face of said sheet member.

GEORGE W. JOHNSON.